W. ALDRICH.
Horse Hay-Rakes.

No. 199,487. Patented Jan. 22, 1878.

Attest:
Chas. M. Peck
Leo Greulich

Inventor:
Wales Aldrich
by his Attys.
Peck & Co.

UNITED STATES PATENT OFFICE.

WALES ALDRICH, OF DAYTON, OHIO, ASSIGNOR OF ONE-HALF HIS RIGHT TO THE DAYTON MACHINE COMPANY, OF SAME PLACE.

IMPROVEMENT IN HORSE HAY-RAKES.

Specification forming part of Letters Patent No. 199,487, dated January 22, 1878; application filed February 16, 1877.

*To all whom it may concern:*

Be it known that I, WALES ALDRICH, of Dayton, in the county of Montgomery and State of Ohio, have invented certain new and useful Improvements in Horse Hay-Rakes; and I do hereby declare the following to be a full, clear, and exact description of the same.

My invention consists of a simple and efficient fastening for the ends of the teeth where they are connected to the rake-head by securing their bent or hooked ends in vertical tapering apertures, as will be herein set forth.

Figure 1:
Figure 2:
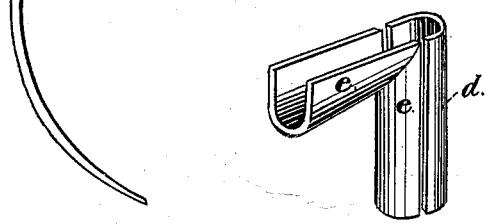
Figure 3:
Figure 4:
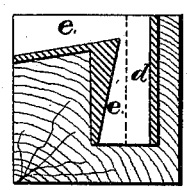

Figure 1 represents a side elevation of my improved tooth, showing the head in transverse section through the tooth-holding socket. Fig. 2 is a perspective view of my improved metal socket-plates. Fig. 3 is a central section, in elevation, of Fig. 2. Fig. 4 represents a modification of the fastening device.

My improvement consists in forming in the top of the rake-head (which may or may not be the axle) equidistant vertically-arranged sockets $a$, as in Fig. 1, which at the top are just large enough to admit the hooked end of the teeth, but which at the bottom are enlarged to allow the limited vertical, but not lateral, play of the teeth. Small inclined grooves or slots $b$, of just sufficient width to hold the teeth, extend from these sockets to the rear edge of the head, at which point they are deepest. The ends of the teeth $c$ are bent at an acute angle, as shown, and lie in the slots $b$ and sockets $a$.

A strip or board, B, secured by a few screws, covers the ends of the whole set of teeth, and prevents their displacement. The reason why the ends of the teeth should be bent at an acute and not at a right angle is because it is often necessary to replace broken teeth, and it is desirable to do so as speedily and with as little labor as possible. By my arrangement it is only necessary to remove the strip B, and the teeth can be removed or replaced. If their ends were bent at right angles it would be necessary to remove the slotted board also.

To make the bearings more durable, I provide a metal socket-plate, Figs. 2 and 4, formed of two parts, of which the one, $d$, is of a semi-cylindrical shape, and the other, $e$, is formed of two pieces, one semi-cylindrical and the other of the shape of the half of a frustum of a cone, both being united at right angles, as represented.

To apply my metallic bearing, whose interior is of the shape of the socket and groove shown in Fig. 1, the piece $e$ is first slipped into the socket, which is made cylindrical to receive it, and rests against its rear edge and in the groove $b$. The piece $d$ is then driven into place as a wedge, to prevent the displacement of the piece $e$. The parts thus form a metal lining to the walls of the socket and groove.

The advantages of this metal bearing are so obvious as to require scarcely any mention. The most important point secured, however, is that by this means the walls of the sockets are prevented from swelling under moisture and embracing the end of the tooth, and so interfering with its independent action.

The modification shown in Fig. 3 consists in forming equidistant inclining grooves or slots in the front face of the head and the sockets $g$, extending from the top of the grooves transversely through the head to the rear, as shown. The ends of the teeth, bent at an acute angle, lie in these grooves, and are covered by a strip, F, of wood or metal, secured to the front face of the head.

I am aware that it is not new to insert the ends of rake-teeth vertically and rigidly into the head and secure them in pairs by metal clips.

What I claim is as follows:

1. A rake-head provided with vertically-arranged sockets $a$ or $f$, larger at the bottom than at the top, and horizontal grooves or sockets $b$ or $g$, larger in the rear than in front, in combination with the strips B or F and the ends of the rake-teeth, bent at an acute angle, as and for the purpose specified.

2. The metal bearing-sockets, composed of the parts $d$ and $e$, constructed and applied as and for the purpose specified.

Witness my hand this 8th day of February, A. D. 1877.

WALES ALDRICH.

Witnesses:
H. C. HERCHELRODE,
CHAS. M. PECK.